United States Patent [19]
Wollermann

[11] Patent Number: 5,398,573
[45] Date of Patent: Mar. 21, 1995

[54] ADJUSTABLE WIRE CUTTING AND STRIPPING APPARATUS

[75] Inventor: Kenneth A. Wollermann, Waterford, Wis.

[73] Assignee: Artos Engineering Company, New Berlin, Wis.

[21] Appl. No.: 903,508

[22] Filed: Jun. 24, 1992

[51] Int. Cl.⁶ .............................................. H02G 1/12
[52] U.S. Cl. ...................................................... 81/9.51
[58] Field of Search .................... 81/9.51; 29/825, 828, 29/564.4, 33 M

[56] References Cited

U.S. PATENT DOCUMENTS

| | | | |
|---|---|---|---|
| 3,857,306 | 12/1974 | Gudmestad | 81/9.51 |
| 3,913,426 | 10/1975 | Blaha | 81/9.51 |
| 4,584,912 | 4/1986 | Gudmestad et al. | 81/9.51 |
| 4,713,880 | 12/1987 | Dusel et al. | 29/564.4 |
| 5,016,347 | 5/1991 | Okazaki et al. | 29/825 |
| 5,038,457 | 8/1991 | Yasushi et al. | 29/564.4 |
| 5,067,379 | 11/1991 | Butler et al. | 83/13 |
| 5,146,673 | 9/1992 | Hoffa | 81/9.51 |
| 5,235,735 | 8/1993 | Koch | 81/9.51 |

FOREIGN PATENT DOCUMENTS

1216815  3/1986  U.S.S.R. ................. 81/9.51

*Primary Examiner*—D. S. Meislin
*Attorney, Agent, or Firm*—Andrus, Sceales, Starke & Sawall

[57] ABSTRACT

An improved apparatus for cutting and stripping insulated wire. The apparatus includes a pair of cutting and stripping units which are mounted on a supporting structure in opposed relation and each cutting and stripping unit includes a central cutting knife and a pair of stripping knives, spaced laterally on opposite sides of the cutting knife. The insulated wire is fed between the cutting and stripping units and when a predetermined length of wire has been fed, the cutting units are moved toward each other in a first stroke of movement to cause the cutting knives to cut a length of wire. The wire and the cut length are then moved axially away from each other by gripping units in a first stroke of movement to position the cut end of the wire and the end of the cut length between the cutting knives and the respective stripping knives. The cutting and stripping units are then moved toward each other in a second stroke of movement to cut the insulation, and the gripping units are subsequently moved in a direction away from each other in a second stroke of movement to strip the insulation from the cut end of the wire and from the cut length. A mechanism is provided for adjusting the first stroke of movement of the gripping units to adjust the strip length and a second adjusting mechanism is included to adjust the stripping stroke of the cutting and stripping units to accommodate different gauges of wire.

24 Claims, 5 Drawing Sheets

ADJUSTABLE WIRE CUTTING AND STRIPPING APPARATUS

BACKGROUND OF THE INVENTION

Electrical harnesses are produced by cutting insulated wire to the desired length, stripping the insulation from the cut ends and then applying terminals to one or both ends of the cut length. In the typical wire cutting and stripping process, wire is contained on a supply coil and fed in the desired increment of length to a cutting and stripping station by cooperating feed rolls or belts. The conventional cutting and stripping station includes a pair of opposed cutting and stripping units, each of which is composed of a central cutting knife and a pair of stripping knives which are located in spaced relation on either side of the cutting knife. After the predetermined length of wire has been fed through the cutting and stripping station, the cutting and stripping units are moved toward each other by fluid cylinders causing the cutting knives to sever the wire and simultaneously causing the stripping knives to cut the insulation.

Wire gripping units, located both upstream and downstream from the cutting and stripping station, grip the wire, as well as the cut length, and move the wire and cut length in opposite directions, thereby stripping the insulation from the ends of the wire and from the cut length.

In one common form of cutting and stripping units, the stripping knives are spaced from the cutting knife by spacer blocks and the entire assembly is clamped in a fixed position in a knife block. With this arrangement, the stripping knives are mounted in a fixed position relative to the cutting knives, so that both the cutting and stripping is accomplished in one operation. To change the strip length, the stripping knives must be manually removed from the knife blocks and relocated. Further, in order to accommodate wires of different gauges, it is necessary to utilize a different set of knives in the knife block.

It has also been proposed to manually adjust the position of the stripping knives relative to the cut-off knife via screws and slides. With this system, the position of the stripping knives can be adjusted without removal, but exact alignment is difficult.

A further proposal has been to separate the stripping knives from the cutting knives, so that cutting is done at one station and stripping at a second station. However, this is not only costly, but requires an additional process station for both the lead and trailing ends of the cut length of wire.

SUMMARY OF THE INVENTION

The invention is directed to an improved wire cutting and stripping mechanism having full adjustability for both wire gauge size and strip length.

In accordance with the invention, a pair of cutting and stripping units are mounted on a frame or supporting structure in opposed relation and each cutting and stripping unit includes a central cutting knife and a pair of stripping knives which are located in spaced relation on opposite sides of the cutting knife.

A pre-selected length of insulated wire is fed by a conventional feeding mechanism between the opposed cutting and stripping units. After the predetermined length of wire has been fed, the cutting and stripping units are moved inwardly in a direction toward each other in a first stroke of movement, causing the cutting knives to sever the wire and provide a cut length. In this stroke of movement, the stripping knives are out of contact with the insulation, so that the insulation is not cut.

The wire, as well as the cut length, are then moved axially in a direction away from each other by wire gripping units to position the cut ends of the wire and the cut length a predetermined distance from the cutting knives. This stroke of movement will determine the strip length.

The cutting and stripping units are then moved in a direction toward each other in a second stroke of movement causing the stripping knives to cut the insulation. After cutting of the insulation, the gripping units are then moved in a direction away from each other in a second stroke of movement to strip the cut slugs of insulation from the ends of the wire and the cut length.

The two-stroke movement of the cutting and stripping unit, is preferably accomplished through use of double fluid cylinder units having a pair of back-to-back cylinders, with piston members slidable within each cylinder. To provide adjustability for the second stroke of movement of the cutting and stripping units, an adjustable stop is associated with the piston rod of one of the cylinders. Engagement of the stop with an end of the cylinder will limit the second stroke of movement to thereby limit the closing of the stripping knives and accommodate various gauges of wire.

Similarly, the gripping units are moved in the two-stroke motion by double cylinder units, each including back-to-back cylinders with pistons slidable in each cylinder. Full adjustability of the first stroke of the gripping units is provided by an adjustable stop which is associated with one of the pistons and is adapted to engage the cylinder end to limit the first stroke of movement of the gripping units. By adjusting the first stroke of movement of the gripping units, the strip length of the wire can be fully and infinitely adjusted.

With the invention, changes in strip length and wire gauge size may be done by simple manual or fully automatic adjustments. The adjustments are infinite, as opposed to steps or increments, thereby providing greater accuracy in establishing the strip length and wire gauge size.

As the wire, as well as the cut length, are moved axially away from the cutting knife before the stripping occurs, the quality of the strip is improved because the stripped slug may rotate as it is being stripped from the wire.

Because the length of the stripped slug is less than the distance between the stripping knives and the cutting knives, the slugs will not wedge between the knives and can be more readily collected.

As a further advantage, the quality of the strip is better, because the cut-off knives by-pass each other and will not bend the end of the wire relative to the stripping knives. In addition, the process height for each end of the wire is the same allowing interchangeability of work stations.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

The drawings illustrate an improved wire cutting and stripping mechanism to be used in conjunction with a terminal attaching machine. The cutting and stripping mechanism includes a supporting structure or frame 1, and an upper cutting and stripping unit 2 and a lower cutting and stripping unit 3 are mounted in vertical alignment on either side of the path of travel of an insulated wire 4 which is intended to be cut and stripped. The wire can be fed in an axial direction to the cutting and stripping mechanism by a conventional feeding unit, such as disclosed in U.S. Pat. No. 5,060,395 and the feeding mechanism of that patent is incorporated herein by reference. Located upstream of the cutting and stripping mechanism is a wire gripping unit 5, while a second lead gripping unit 6 is located downstream of the cutting and stripping units 2 and 3.

The construction of the upper and lower cutting and stripping units 2 and 3 is identical and the following description will be directed to the construction of the lower cutting and stripping unit 3, and it is understood that a similar construction is used in conjunction with the upper unit 2.

Figures 1, 2:
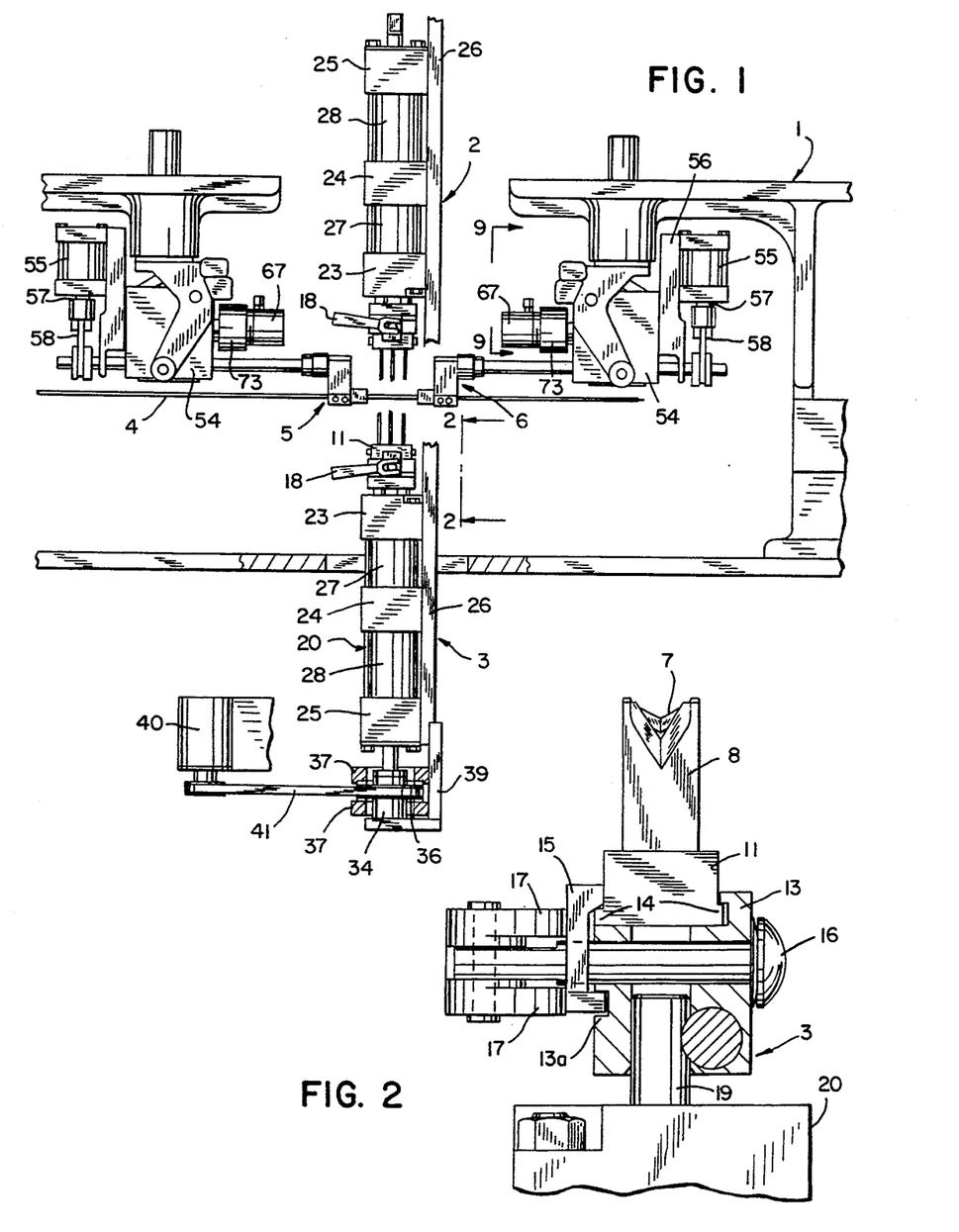
FIG. 1 is a front elevation of the cutting and stripping station of the invention.
FIG. 2 is a view taken along line 2—2 of FIG. 1.

The cutting and stripping unit 3 includes a cutting blade or knife 7, which is mounted between a pair of stripping blades or knives 8. As best shown in FIG. 2, the outer cutting edge of cutting knife 7 has a V-shape, and the outer edges of stripping knives 8 are similarly provided with a V-shaped configuration, but the depth of the V is greater in the stripping knives 8 than depth of the V is greater in the stripping knives 8 than in the cutting knives 7.

Figure 4:
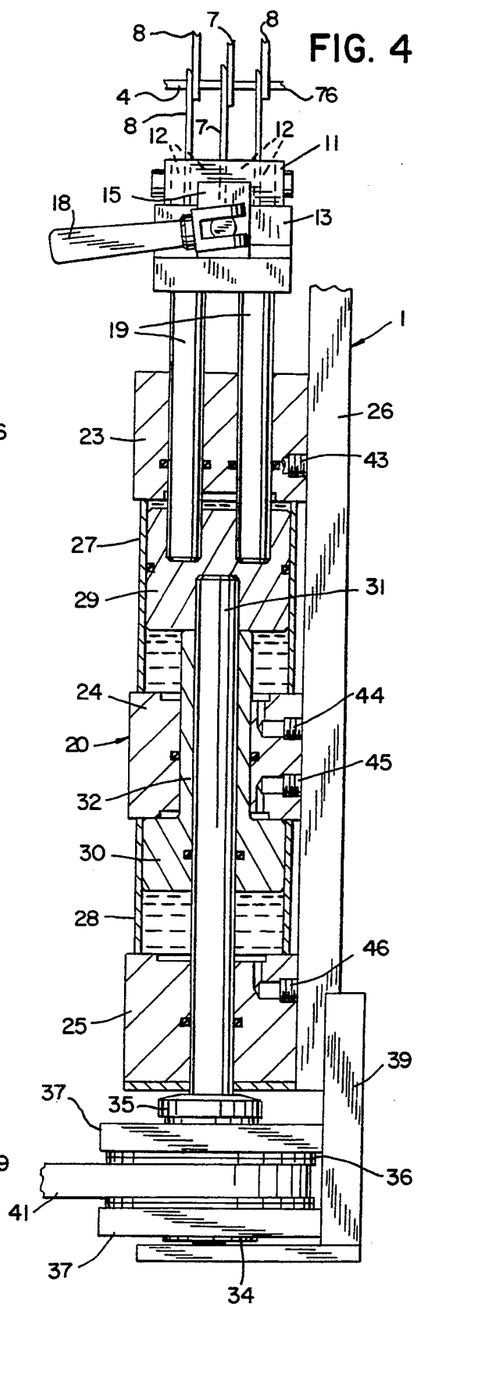
FIG. 4 is a view similar to FIG. 3 showing the cutting and stripping unit at the end of its first stroke of movement in the cutting position.
Figure 5:
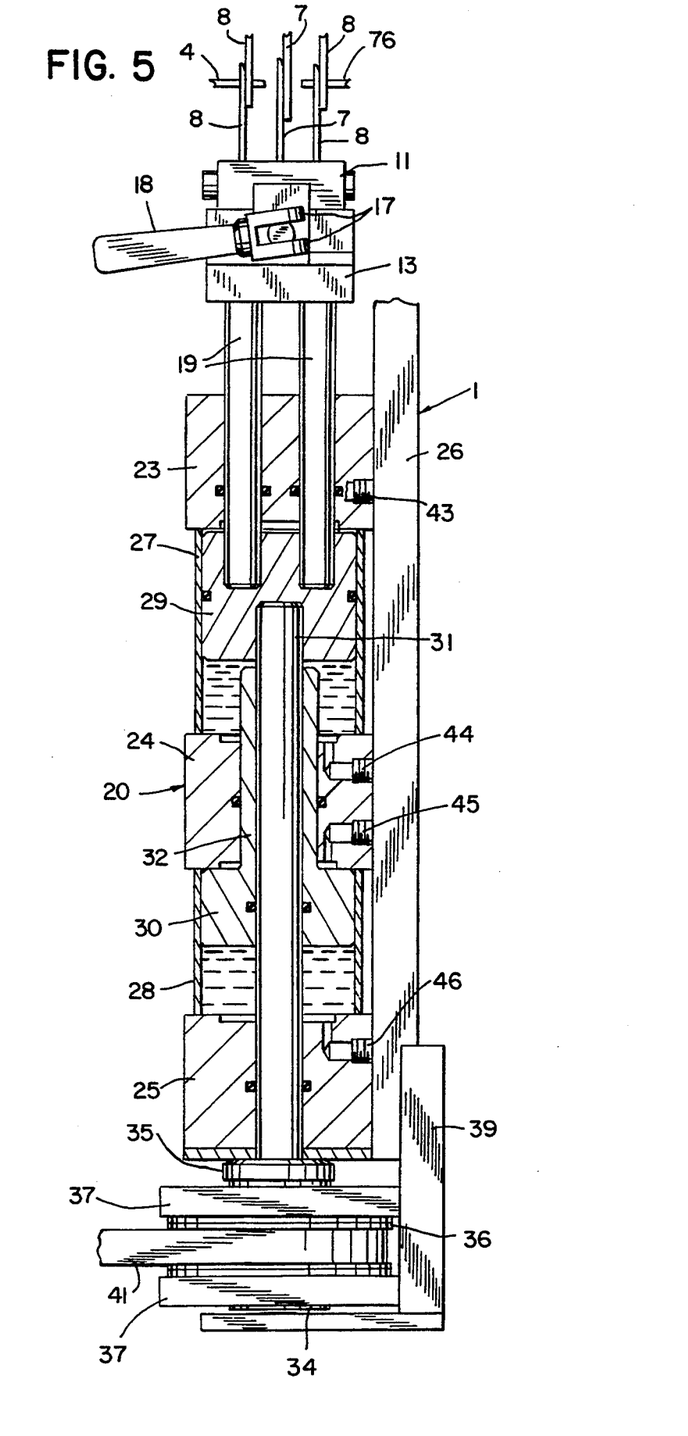
FIG. 5 is a view similar to FIG. 3 showing the cutting and stripping unit at the end of its second stroke of movement in the stripping position.

The cutting knife 7 of the lower unit 3 is arranged with respect to the cutting knife of the upper unit 2, so that the cutting knives will move in offset relation, as shown in FIGS. 4 and 5. Similarly, the stripping knives 8 of the lower unit 3 are offset from the stripping knives of the upper unit 2.

The inner ends of knives 7 and 8 are mounted in a block 11 and the ends of the knives are spaced apart by spacers 12. Block 11, in turn, is supported in a knife-block 13. As best shown in FIG. 2, opposed sides of block 11 are provided with outwardly extending flanges or lips 14 and one of the flanges is mounted in a groove in knife block 13. One edge of clamping bar 15 is engaged with the other flange 14 of block 11, while the opposite edge of the clamping bar is received within a groove 13a in knife block 13.

To secure the block 11, which carries the blades 7 and 8 to the knife block 13, a draw bolt 16 extends through aligned openings in knife block 13, as well as clamping bar 15, and cams 17 are mounted for pivotal movement on the end of the draw bolt. Handle 18 is connected to cam 17. Through movement of the handle, the cam will exert a clamping force on the clamping bar 15 to thereby secure the block 11 to the knife block 13.

Knife block 13 is secured to the projecting ends of a pair of parallel piston rods 19 of double cylinder unit 20.

Cylinder unit 20 includes fixed caps 23, 24 and 25, each of which is connected to vertical frame member 26 of frame 1. Cylinder 27 is connected between caps 23 and 24, while a second cylinder 28 connects caps 24 and 25.

Mounted for sliding movement within cylinder 27 is a piston 29 which is connected to the dual piston rods 19. A second piston 30 is mounted for movement within cylinder 28 and carries a hollow cylinder rod 32 which extends through a central opening in cap 24.

Attached to the inner face of piston 29 is a rod 31 which is slidable within cylinder rod 32 and piston 30. The outer or lower end of rod 31 extends freely through an opening in cap 25 and a stud 33 is threaded within the outer end of the rod. Stud 33, in turn, is threaded within a nut 34, and nut 34 carries an annular cushion 35, preferably made of plastic material which, during operation of the cylinder unit 20, is adapted to engage the end of cap 25 and functions as a stop.

The position of nut 34 and cushion 35 relative to end cap 25 can be adjusted to vary the stroke of the cylinder unit. The adjustment is accomplished by a pulley 36 which is splined to the outer surface of nut 34, so that rotation of the pulley will be transmitted to the nut, but the nut can move axially relative to the pulley.

Pulley 36 is journaled for rotation between a pair of rings 37 by thrust bearings 38. Rings 37 are connected through bracket 39 to frame member 26. With this construction, rotation of pulley 36 will move nut 34 axially to adjust the position of the nut and cushion 35 relative to end cap 26 of the cylinder unit 20.

Pulley 36 can be rotated to adjust the position of the nut 34 by a servo motor 40, the output shaft of which is connected through a timing belt 41 to pulley 36.

A fluid, such as air, can be introduced and exhausted from the upper end of cylinder 27 through a port 43, which extends through cap 23 and communicates with cylinder 27. A similar port 44 in cap 24 is connected to the lower end of cylinder 27. Similarly, air can be fed to and exhausted from the upper end and lower end of cylinder 28 through port 45 in cap 24 and port 46 in end cap 25, respectively.

Figure 3:
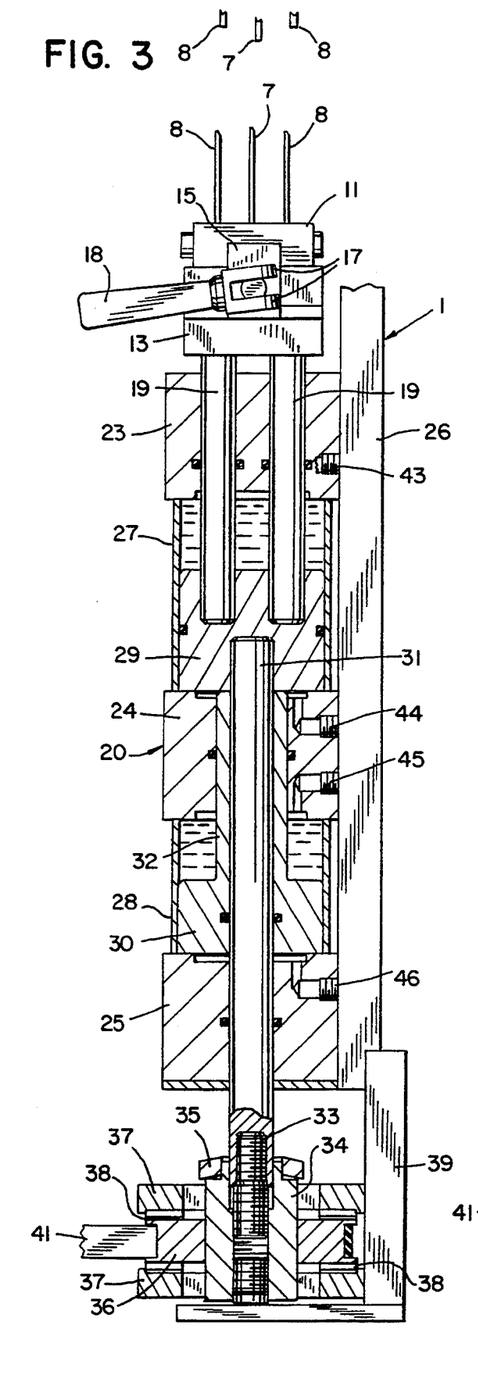
FIG. 3 is n enlarged front elevation of the lower cutting and stripping unit with the unit being shown in the open position.

The double cylinder unit 20 enables the knives 7 and 8 to be moved between three distinct positions, namely an open position, as shown in FIG. 3, where the knives 7 and 8 are out of contact with wire 4, to an intermediate or cutting position, as seen in FIG. 4, in which the cutting knives 7 have cut or severed the wire, but the stripping knives 8 are out of contact with the wire, to a third or closed position, as seen in FIG. 5, where the stripping knives 8 have cut the insulation on wire 4.

The sequencing of the cylinder unit 20 is illustrated in FIGS. 3–5. FIG. 3 shows the cylinder unit 20 in the open position with the knives 7 and 8 being out of contact with the wire 4. In this position low pressure air, at perhaps 40 psi, is introduced through ports 43 and 45 into cylinders 27 and 28, while ports 44 and 46 are connected to exhaust. The pressure of the air introduced through ports 43 and 45 will move both pistons 29 and 30 downwardly in cylinders 27 and 28 to maintain the knives 7 and 8 in the open position.

To move the knives 7 and 8 to the cutting position, high pressure air, at a pressure of perhaps 80 psi, is introduced into the lower end of cylinder 28 through port 46, while ports 44 and 45 are connected to exhaust, and low pressure air is continued to be applied through port 43 to the upper end of cylinder 27. The high pressure air being introduced through port 46 will move the piston 30 upwardly, and as the upper end of sleeve 32 is engaged with piston 29, the piston 29 will correspondingly be moved upwardly in cylinder 27 to move the blades 7 and 8 to the cutting position where the wire 4 will be severed by the cutting knives 7. Engagement of the upper end of piston 30 with cap 24, as seen in FIG. 4, will limit the upward movement of piston 29 and knives 7 and 8. In this position, the stripping knives 8 are out of contact with wire 4 and have not cut the insulation.

To move the knives 7 and 8 to the closed or stripping position, high pressure air is introduced into the lower end of cylinder 27 through port 44, while port 43 is connected to exhaust, as is port 45. The high pressure gas in the lower end of cylinder 27 will move piston 29 upwardly and upward movement of piston 29 will move the knives 7 and 8 to the stripping position, where the stripping knives will cut the insulation on the wire. Upward movement of piston 29 acting through rod 31, which is connected to the piston, will move nut 34 upwardly until cushion 35 engages the lower end of cap 25 to limit the stroke of movement, as seen in FIG. 5. At this point, the upper piston 29 is spaced a slight distance from the upper cap 23, as shown in FIG. 5.

By adjustment of the position of nut 34 on the end of rod 31, the closed position of the stripping knives 7 is correspondingly controlled, thus providing a convenient adjustment for the gauge or diameter of the wire 4.

The construction of the two gripping units 5 and 6 is identical and hence the gripping unit 6 will be described in detail with the description thereof being understood also to describe the gripping unit 5.

Gripping unit 6 includes a clamping head 50 having a pair of jaws 51 that are mounted for pivoting movement on parallel slider rods 52. Jaws 51 are adapted to be moved between an open position and a closed position where the jaws will engage and clamp the wire 4.

Rods 52 are mounted for sliding movement within tubular guides 53 formed in the lower portion of gripper body 54.

To rotate rods 52 and thus move the jaws between the open and closed position, a fluid cylinder 55 is mounted to a bracket 56 and a piston rod or ram 57 extends downwardly from cylinder 55 and is connected through linkage 58 to the ends of rods 52, as best seen in FIG. 1. Movement of piston rod 57 acting through linkage 58 will rotate the rods 52 to thereby pivot the clamping jaws 5, between the open and closed positions. The construction of the clamping jaws 51 and the mechanism for moving the jaws between the open and closed position is similar to that described in U.S. Pat. No. 4,713,880 and, therefore, the construction of that patent is incorporated herein by reference.

Slider rods 52 are also adapted to be moved in a longitudinal direction parallel to the axis of wire 4 by a second fluid cylinder unit. In this regard, body 54 defines a cylinder 60 and a piston 62 is mounted for sliding movement within cylinder 60. A piston rod 63, which is connected to piston 62, extends outwardly through one end of cylinder 60 and is connected to bracket 56. Thus, movement of the piston 62 in cylinder 60 will be transmitted through bracket 56 to move the rods 52 in a longitudinal direction for stripping purposes as will be hereinafter described.

Figure 6:
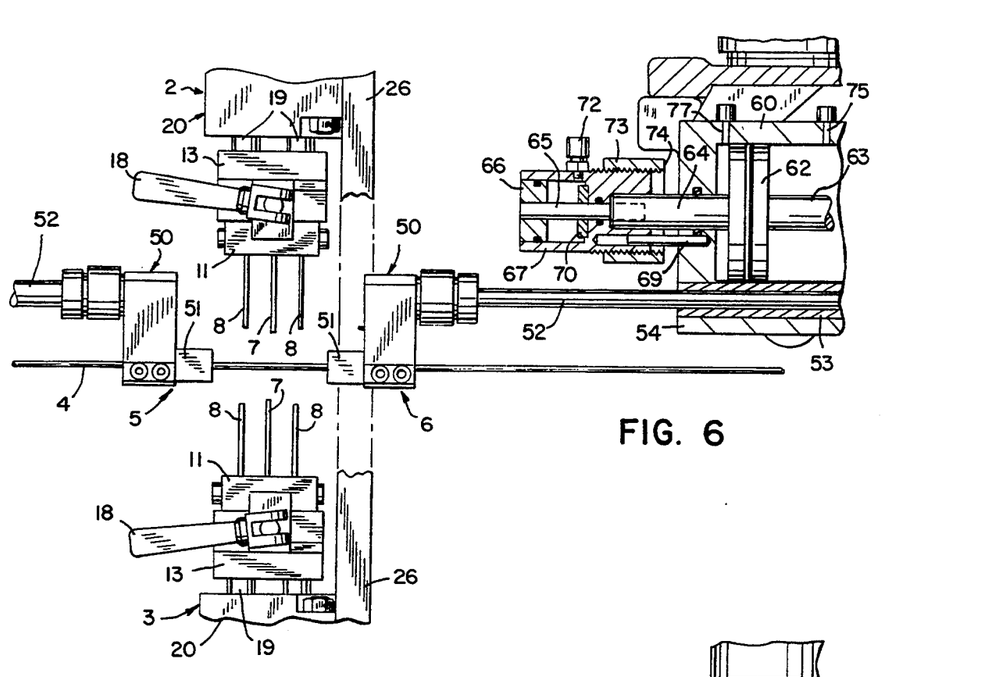
FIG. 6 is an enlarged front elevation with parts broken away in section showing the downstream gripping unit in its initial position.
Figure 7:
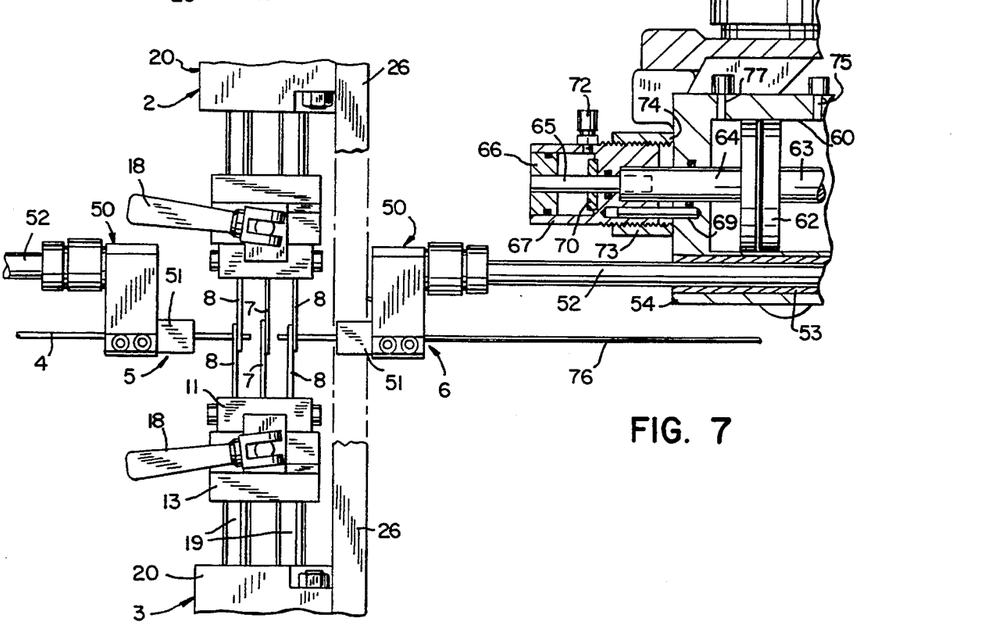
FIG. 7 is a view similar to FIG. 6 showing the gripping unit at the end of its first stroke of movement.
Figures 8, 9:
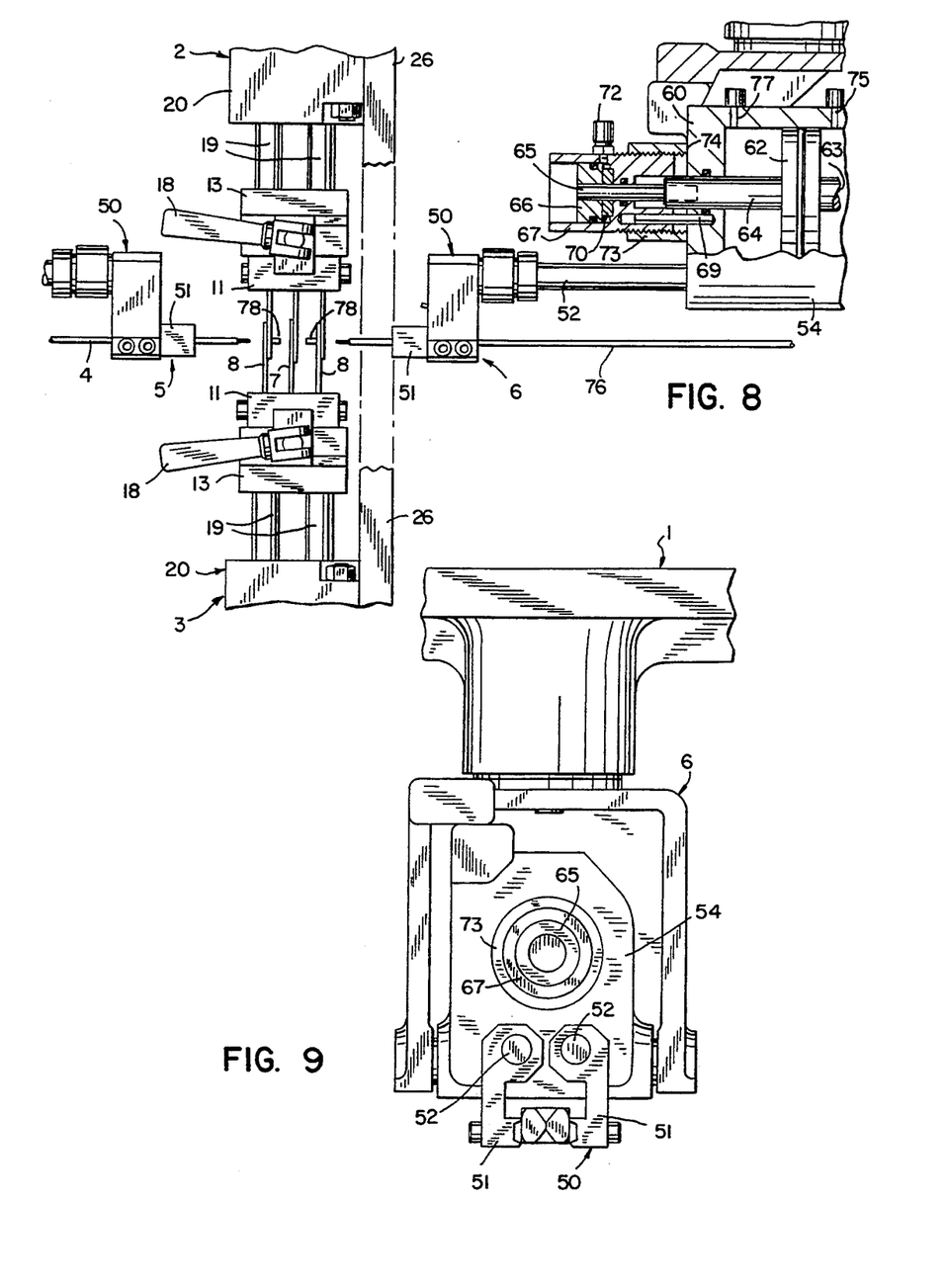
FIG. 8 is a view similar to FIG. 6 showing the gripping unit at the end of its second stroke of movement.
FIG. 9 is an end view taken along lines 9—9 of FIG. 1.

In accordance with the invention, a mechanism is incorporated for automatically adjusting the strip length. This mechanism includes a second piston rod 64, which is connected to piston 62 and extends outwardly through the opposite end of cylinder 60, as best shown in FIGS. 6–8. A rod 65 is threaded within the end of piston rod 64 and the outer end of rod 65 carries a piston 66, which is slidable within cylinder 67. Piston 66 is shown to be threaded on rod 65 and the outer face of piston 66 can be provided with a pair of tool access holes which are adapted to receive a tool through which the piston 66 can be threaded on rod 65.

To prevent rotation of cylinder 67 relative to body 54, a pin 69 is connected to body and is slidably received within an elongated passage in the end of cylinder 67.

Mounted in a recess in the internal face of cylinder 67 is an annular resilient cushion 70, which acts to cushion the inward stroke of piston 66.

A fluid, such as air, is adapted to be introduced and exhausted from cylinder 67 through line 72.

Threaded on the outer surface of cylinder 67 is a nut or sleeve 73, and the inner end 74 of the nut defines a stop which is adapted to engage the end of body 54 in the stripping sequence as will be hereinafter described.

In the sequence of operations, FIG. 6 shows the gripping unit 6 in a position when the knives 7 and 8 are in the open condition and the wire 4 is fed past the cutting and stripping units 2 and 3. In this position the slider rods 52 are in the extended position and the jaws 51 are open. Low pressure air is introduced into the right hand side of cylinder 60 (as seen in FIG. 6) through port 75, while high pressure air is introduced into cylinder 67 through line 72. In this condition, the pressure of the air in cylinder 60 will move the piston rod 64 outwardly and the end 74 of nut 73 will be spaced from the end of the gripper body 54, as illustrated in FIG. 6. The threaded adjustment of nut 73 on cylinder 67 will determine the distance between the nut end 74 and the gripper body 54.

After the wire has been cut by moving the knives 7 and 8 to the intermediate position and with the stripper blades still out of contact with the wire, the clamping jaws are pivoted to the closed position to clamp the wire 4, and the slider rods are then retracted causing the closed clamping jaws 51 to move the wire 4 and the cut length 76 away from each other to determine the strip length. Retraction of rods 52 is accomplished by introducing low pressure (40 psi) air into the left hand side of cylinder 60 through port 77, as shown in FIG. 7, and exhausting the air in the right hand side of the cylinder through port 75, thereby causing the piston 66 to move to the right. This action will draw the cylinder 67 and nut 73 toward the gripper body 54. The retraction of the slider rods is limited by the engagement of the stop 74 on nut 73 with the gripper body, thus positioning the cut end of the wire, as well as the cut end of length 76, a predetermined distance from the cutting knives 7 and determining the strip length of the wire.

The double cylinder units 20 are then actuated to move the stripper blades 8 to the stripping position to cause the stripper blades to cut the insulation on the wire.

After the insulation has been cut, the pressure is exhausted from the cylinder 67 and this enables a piston 62 to move further to the right, as shown in FIG. 8, under the influence of the lower pressure in the left hand side of cylinder 60. Movement of the piston 62 will draw the piston 66 inwardly until it seats against the cushion 70. Engagement of the piston 66 with cushion 70 serves as a second stop or limit for the retracting movement of the rods 52 and gripping jaws 51. As the jaws 51 are retracted, the slugs of insulation 78, as shown in FIG. 8, are stripped from the cut ends of the wire by the stripping knives 8.

Sequence of Operations

When the wire 4 is being fed to the cutting and stripping mechanism, the knives 7 and 8 will be in the open position, as shown in FIG. 3. In this condition, low pressure air is introduced through ports 43 and 45 into cylinders 27 and 28 respectively, while ports 44 and 45 are connected to exhaust, thereby holding the pistons 29 and 30 in their outermost positions. At this time, the clamping jaws 51 of the gripping units 5 and 6 are open and the slider rods 52 are in the extended position. Nuts 73 are spaced from the gripper bodies 54.

After the wire has been fed across the cutting and stripping units 2 and 3, the clamping jaws 51 of gripping units 5 and 6 are moved to the closed position by operation of cylinders 55 to grip the wire. The knives 7 and 8 of both units 2 and 3 are moved toward the wire to cause the cutting knives 7 to sever the wire, as shown in FIG. 3. In this position, the stripper knives 8 have not cut the insulation on the wire.

The knives 7 and 8 are moved to the cutting or intermediate position, as seen in FIG. 3, by introducing high pressure air into the cylinders 28 through ports 46 and connecting ports 44 and 45 to exhaust, thus forcing the pistons 30 and the pistons 29 inwardly to move the cutting knives 7 into the cutting relation.

With the wire cut, the clamping jaws 51 of both gripping units 5 and 6 are each moved in a first stroke of movement away from each other by introducing lower pressure air into the cylinders 60 through ports 77. The initial stroke of movement of jaws 51 is controlled by engagement of nuts 73 with the respective gripper bodies 54. As previously noted, the threaded adjustment of the nuts 73 on cylinder 67 will determine the distance of retraction of wire 4 and the cut length 76, and thus the strip length.

With the wire 4 and length 76 retracted in a first increment, the cutting blades 7 and 8 are then moved to the fully closed position by introducing high pressure air through ports 44 into the cylinders 27 of units 2 and 3, thereby moving the pistons 29 further inwardly and bringing the cushions 35 on nuts 34 into engagement with the outer end of the caps 25, thus limiting the stroke of movement. This stroke of movement will move the stripping knives 8 together to cut the insulation on the wire and on cut length 76.

With the insulation then cut, the pressure in each cylinder 67 is exhausted through port 72 enabling the piston 62 in each cylinder 60 to move in a direction to further retract the clamping jaws 51. This second stroke of movement is limited by engagement of the pistons 66 with the cushions 70 and this sequence will strip the slugs 78 of insulation from the ends of the wire, as shown in FIG. 8.

The position of nut 73 on cylinder 67 can be adjusted either manually or through a servo motor and pulley arrangement similar to that described in connection with the adjustment of nut 34.

With the invention, changes in strip length and wire gauge size can be accomplished by either simple manual or fully automatic adjustment. The adjustments are infinite, as opposed to steps or increments, thereby providing greater accuracy in establishing the strip length and wire gauge size.

As the wire 4, as well as the cut length 76 are moved axially away from the cutting knives 7 before the stripping occurs, as seen in FIG. 7, the quality of the strip is improved because the stripped slugs 78 can rotate as they are being stripped from the wire. As a further advantage, the length of the stripped slugs 78 is less than the distance between the stripping knives 8 and the cutting knives 7, as seen in FIG. 8. Thus, the slugs 78 will not wedge between the cutting and stripping knives and can be more readily collected.

Various modes of carrying out the invention are contemplated as being within the scope of the following claims particularly pointing out and distinctly claiming the subject matter which is regarded as the invention.

I claim:

1. An apparatus for cutting and stripping insulated wire, comprising a supporting structure, a pair of cutting and stripping units mounted on the supporting structure, each cutting and stripping unit including a central cutting knife and a pair of stripping knives spaced laterally on either side of said cutting knife, means for feeding an insulated wire downstream between said cutting and stripping units, first means for moving said cutting and stripping units in a direction toward each other in a first stroke of movement to cause the cutting knives to sever the wire and provide a cut length, a pair of gripping units, one of said gripping units located upstream of said cutting and stripping units and disposed to grip said wire and the other of said gripping units disposed downstream of said cutting and stripping units and disposed to grip said cut length, second means for moving said gripping units in a direction away from each other in a first stroke of movement to position the cut end of said wire and the cut end of said length at a location between the cutting knife and the respective stripping knife, third means for moving the cutting and stripping units in a direction toward each other in a second stroke of movement to cause said stripping knives to sever the insulation on the wire and on said length, and fourth means for moving said gripping units in a direction away from each other in a second stroke of movement to strip the insulation from said wire and from said length, said first and third means comprising a double fluid cylinder unit associated with each cutting and stripping unit.

2. The apparatus of claim 1, and including adjusting means operably connected to said third means for adjusting the second stroke of movement of said third means.

3. The apparatus of claim 1, and including second adjusting means operably connected to said second means for adjusting the stroke of said second means to thereby adjust the length of strip.

4. The apparatus of claim 1, wherein each cylinder unit includes a pair of cylinders disposed in axial alignment, first piston means disposed for movement in a first of said cylinders, second piston means disposed for movement in a second of said cylinders, said first piston means being connected to the cutting and stripping unit and said second piston means having a first end operably connected to said first piston means.

5. The apparatus of claim 4, and including means for supplying a fluid to said first cylinder to thereby move said cutting and stripping unit in said first stroke of movement, and means for supplying fluid to said second cylinder to thereby move said cutting and stripping unit in said second stroke of movement.

6. The apparatus of claim 5, and including first stop means for limiting the stroke of said first piston means and second stop means for limiting the stroke of said second piston means.

7. The apparatus of claim 6, and including adjusting means for adjusting the position of said second stop means to thereby adjust the length of said second stroke.

8. The apparatus of claim 7, wherein said second piston means has a second end extending outwardly of said second cylinder, said second stop means being mounted on said second end and disposed to engage an abutment on movement of said second piston means, said adjusting means comprising means for moving said stop means on said second end.

9. The apparatus of claim 8, wherein said means for moving said stop means comprises a drive unit, and connecting means connecting the drive unit with said stop means.

10. The apparatus of claim 9, wherein said stop means comprises a nut threaded on said second end and said connecting means is constructed and arranged to rotate said nut to thereby adjust the position of said nut on said second end.

11. The apparatus of claim 10, wherein said connecting means comprises a pulley mounted on said nut, and a driving member interconnecting the pulley and said drive unit.

12. An apparatus for cutting and stripping insulated wire, comprising a supporting structure, a pair of cutting and stripping units mounted on the supporting structure, each cutting and stripping unit including a central cutting knife and a pair of stripping knives spaced laterally on either side of said cutting knife, means for feeding an insulated wire downstream between said cutting and stripping units, first means for moving said cutting and stripping units in a direction toward each other in a first stroke of movement to cause the cutting knives to sever the wire and provide a cut length, a pair of gripping units, one of said gripping units located upstream of said cutting and stripping units and disposed to grip said wire and the other of said gripping units disposed downstream of said cutting and stripping units and disposed to grip said cut length, second means for moving said gripping units in a direction away from each other in a first stroke of movement to position the cut end of said wire and the cut end of said length at a location between the cutting knife and the respective stripping knife, third means for moving the cutting and stripping units in a direction toward each other in a second stroke of movement to cause said stripping knives to sever the insulation on the wire and on said length, and fourth means for moving said gripping units in a direction away from each other in a second stroke of movement to strip the insulation from said wire and from said length, said second means and said fourth means comprising a double cylinder unit associated with each gripping unit.

13. The apparatus of claim 12, wherein each cylinder unit includes a pair of cylinders disposed in axial alignment, first piston means disposed for movement in a first of said cylinders, second piston means disposed for movement in a second of said cylinders, said first piston means being connected to the gripping unit and said second piston means having a first end operably connected to said first piston means.

14. The apparatus of claim 13, and including means for supplying a fluid to said first cylinder to thereby move said gripping unit in said first stroke of movement, and means for supplying fluid to said second cylinder to thereby move said gripping unit in said second stroke of movement.

15. The apparatus of claim 14, and including first stop means for limiting the stroke of said first piston means and second stop means for limiting the stroke of said second piston means.

16. The apparatus of claim 15, and including adjusting means for adjusting the position of said second stop means to thereby adjust the length of said second stroke.

17. The apparatus of claim 16, wherein said second piston means has a second end extending outwardly of said second cylinder, said second stop means being mounted on said second end and disposed to engage an abutment on movement of said second piston means, said adjusting means comprising means for moving said stop means on said second end.

18. The apparatus of claim 17, wherein said means for moving said stop means comprises a drive unit, and connecting means connecting the drive unit with said stop means.

19. The apparatus of claim 18, wherein said stop means comprises a nut threaded on said second end and said connecting means is constructed and arranged to rotate said nut to thereby adjust the position of said nut on said second end.

20. The apparatus of claim 19, wherein said connecting means comprises a pulley mounted on said nut, and a driving member interconnecting the pulley and said drive unit.

21. In an apparatus for cutting and stripping insulated wire, a gripping unit having a pair of cooperating gripping members to grip an insulated wire, first means for moving said gripping unit in an axial direction of said wire in a first stroke of movement and second means for moving the gripping unit in said axial direction in a second stroke of movement, said first and second means comprising a double fluid cylinder unit connected to said gripping unit.

22. The apparatus of claim 21, and including adjusting means for adjusting the stroke of movement of said first means.

23. In an apparatus for cutting and stripping insulated wire, a supporting structure, a pair of cutting and stripping units mounted on the supporting structure, each cutting and stripping unit including a central cutting knife and a pair of stripping knives each spaced laterally from the cutting knife, means for feeding an insulated wire downstream between said cutting units, first means for moving said cutting and stripping units in a direction toward each other in a first stroke of movement to cause said cutting knives to sever said wire and provide a cut length, second means for moving the cutting and stripping units in a direction toward each other in a second stroke of movement to cause the stripping knives to cut the insulation on the wire and on the cut length to provide cut slugs of insulation on the end of the wire and on the end of the cut length, and means for removing said slugs from the wire and the cut length, said first and second means comprising a double fluid cylinder unit associated with each cutting and stripping unit.

24. The apparatus of claim 23, and including adjusting means operably connected to said second means for adjusting the length of said second stroke of movement to accommodate different gauges of wire.

* * * * *